Figure 1:
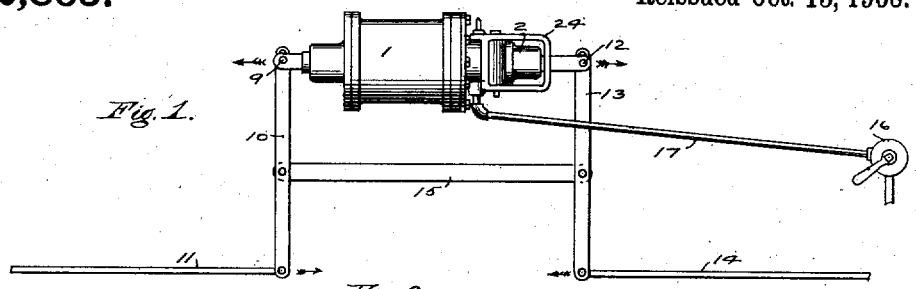
Figure 2:
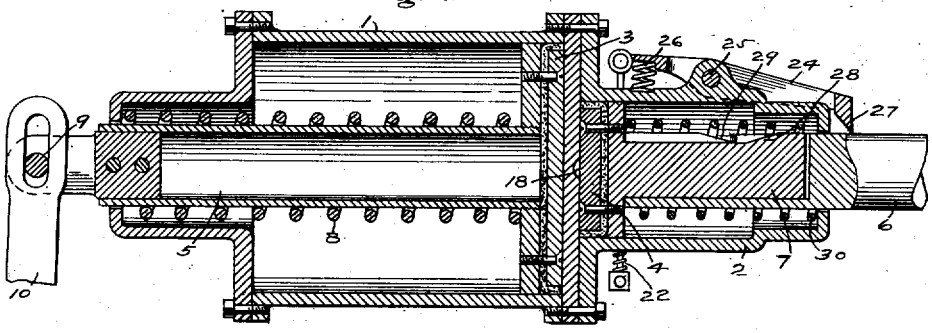
Figure 3:
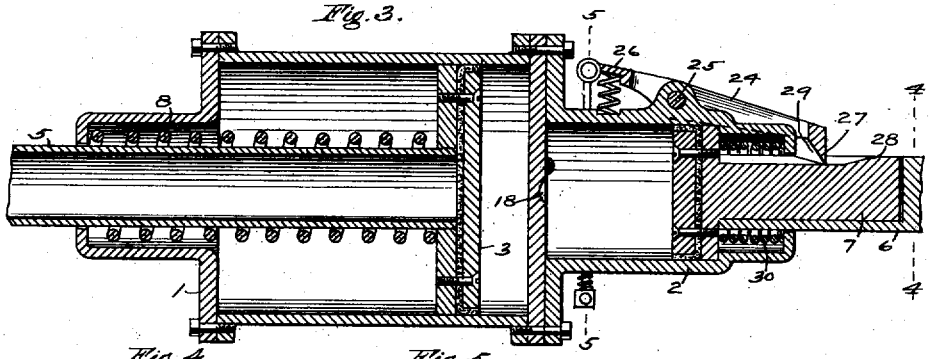
Figure 4:
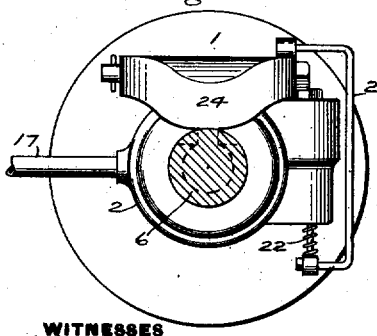
Figure 5:
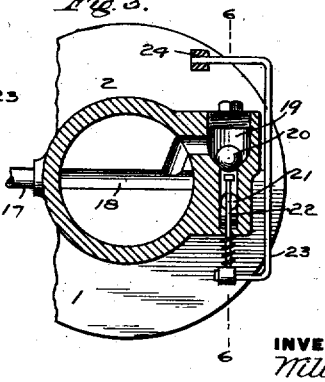
Figure 6:
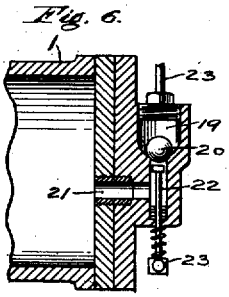

W. O. MUNDY, DEC'D.

K. E. MUNDY, ADMINISTRATRIX.

AIR BRAKE.

APPLICATION FILED NOV. 10, 1906.

12,863. Reissued Oct. 13, 1908.

WITNESSES

J. S. Custer

J. B. MacDonald

INVENTOR

William O. Mundy

E. A. Wright

Att'y.

THE NORRIS PETERS CO., WASHINGTON, D. C.

UNITED STATES PATENT OFFICE.

THE WESTINGHOUSE AIR BRAKE CO., OF PITTSBURG, PENNSYLVANIA, ASSIGNEE OF KATHLEEN EDDY MUNDY, ADMINISTRATRIX OF WILLIAM O. MUNDY, DECEASED.

AIR-BRAKE.

No. 12,863. Specification of Reissued Letters Patent. Reissued Oct. 13, 1908.

Original No. 763,310, dated June 21, 1904, Serial No. 157,711. Application for reissue filed November 10, 1906. Serial No. 342,919.

*To all whom it may concern:*

Be it known that WILLIAM O. MUNDY, now deceased, formerly a citizen of the United States, residing in the city of St. Louis and State of Missouri, did invent certain new and useful Improvements in Air-Brakes, of which the following is a full, clear, and exact description, reference being had to the accompanying drawings, forming part of this specification.

This invention relates to the construction of the cylinder feature of an air brake, the arrangement being such that a small cylinder and piston are utilized for imparting the initial movement to the brake shoes and a large cylinder and piston utilized for exerting the final pressure. In this way a quick action of the shoes during the first part of their movement is obtained and with the use of a small amount of air, and a comparatively slow and powerful movement when the pressure is to be exerted by the shoes on the wheels. Likewise a quick release of the brakes is obtained when the valve is moved to release position.

This invention consists in features of novelty hereinafter fully described, and pointed out in the claims.

Figure I is a top or plan view illustrative of this invention. Fig. II is an enlarged horizontal longitudinal section of the cylinders and their associated parts, both of the pistons being shown in their inner or normal positions. Fig. III is a like view showing the pistons in their outer or operative positions. Fig. IV is a vertical section taken on line IV IV, Fig. III. Fig. V is a vertical section taken on line V V, Fig. III. Fig. VI is a vertical section taken on line VI VI, Fig. V.

Referring to the drawings, 1 represents a cylinder, at one end of which is located a much smaller cylinder 2. The cylinder 1 is provided with a suitable piston 3 and the cylinder 2 with a suitable piston 4. The piston 3 has a stem 5 and the piston 4 a divided stem 6, 7. The stem 5 is surrounded by a coil-spring 8, located within the cylinder 1, and the outer end of this stem has a slot-and-pin connection 9 with one end of a lever 10, the other end of which is connected by a rod 11 to the brake shoe mechanism. (Not shown). The outer member 6 of the stem of the piston 4 has a slot-and-pin connection 12 with one end of a lever 13, the other end of which is connected by a rod 14 to the brake shoe mechanism located at the other end of the car from that to which the rod 11 is connected. The two levers 10 and 13 are connected together by an equalizing-bar 15.

16 represents the usual three-way valve ordinarily employed in connection with an air brake, and 17 is the pipe extending from the valve 16 and which communicates with the inner end of the cylinder 2 through a port 18. The port 18 connects with a chamber 19, located on one side of the cylinder 2 and in which there is a ball-valve 20, that controls the passage of air through a port 21, that leads from the chamber 19 to the inner end of the large cylinder 1. Beneath the valve 20 is a spring-actuated stem 22, the lower end of which is connected to or rests upon a bar or rod 23, the upper end of which is connected to a lever 24, pivoted at 25 to the cylinder 2. The outer end of the lever 24 is held depressed and its inner end elevated by means of a spring 26. The lever 24 is in the form of a U-shaped frame, (see Figs. I and IV), and its outer end or nose 27 rides upon the outer member 6 of the stem of the piston 4. The inner end of the member 6 is socketed to receive the member 7 of the stem, and the upper face of the inner end of the member 6 has a slot for the passage of the projection 28 on the outer end of the part 7 of the stem. The member 6 is also provided with a notch 29 to receive the nose 27 of the lever 24 when the piston 4 has been moved to its outer position. The stem of the piston 4 is surrounded by a coil-spring 30, located within the cylinder.

The operation is as follows: When the air is turned on, the piston 4 is moved outwardly, and through means of the described connection between the stem of this piston and the rods 11 and 12 the initial movement is imparted to the brake-shoes, this movement being rapid and being effected with the use of but a small amount of air. When the piston has reached the limit of its outward movement, the brake shoes will have been brought up close against the wheels, and at this time the nose 27 of the lever 24 will drop into the notch 29 of the stem of the piston. This movement of the lever 24 lifts the stem 22 and opens the valve 20, so that air will pass into the large cylinder and thrust its piston forward to exert the final pressure on the brake shoes, and thus the final pressure is exerted by the action of a large cylinder and piston, whereas the long and initial movement of the brake shoes has been effected by the use of a small cylinder and piston. With this form of construction having the small and large brake cylinders located back to back, or with their pressure sides adjacent and their piston rods extending in opposite directions, a locking device, such as the lever 24 with its nose or pawl 27 for engaging the notch 29, is evidently necessary for preventing the small piston and rod 6 being forced back in its cylinder when the pressure is applied to the large piston. The reactionary force from the large piston acts to force the notch 29 of rod 6 against the nose of the lever 24 with considerable pressure, so that the lever cannot be readily raised from the notch to permit the return movement of the small piston until the fluid pressure in the brake cylinders is reduced nearly to atmospheric pressure. As the movement of the small piston and rod operates to take up the slack and bring the brake shoes against the wheels the travel of the large piston in applying the final pressure is small, so that only a minimum amount of compressed air is employed for producing maximum braking power, and a quicker release of the brakes may also be produced. When the supply valve is moved to its release position for opening communication from the brake cylinders to the atmosphere, air is discharged from the large brake cylinder through the port 21 and chamber 19, and from the small cylinder through port 18 until the pressure therein is reduced nearly to that of the atmosphere, then the spring 30 will cause the piston-head, with the part 7 of its stem, to be moved inwardly. This causes the inclined face of the projection 28 on the part 7 to come against the lever 24 and raise the nose 27 of the lever out of the notch 29. This permits the valve 20 to close and also releases the member 6 of the stem of the small piston, which will now be moved inwardly by the brake shoes being thrown from their wheels by the use of the ordinary springs employed for this purpose and which are not shown.

Having now described this invention, what it is desired to claim and secure by Letters Patent, is:—

1. In a brake mechanism, a small cylinder and piston for imparting initial movement to the brake shoes, a large cylinder and piston for exerting the final pressure on the shoes, and a valve mechanism controlling the passage of air from the small into the large cylinder through a port that forms a communication between said cylinders, substantially as set forth.

2. In a brake mechanism, the combination of a small cylinder and piston for imparting initial movement to the shoes, a large cylinder and piston for exerting the final pressure on the shoes, a valve mechanism for controlling the passage of air from the small to the large cylinder, and mechanism for automatically opening said valve when the small piston has been moved to its outer position, substantially as set forth.

3. In a brake mechanism, the combination of a small cylinder and piston for imparting initial movement to the shoes, a large cylinder and piston for exerting the final pressure on the shoes, a valve controlling the passage of air from the small to the large cylinder, and means for opening said valve, consisting of a pivoted lever, the outer end of which is adapted to engage a notch in the stem of the small piston and which is at its other end provided with means for lifting said valve, substantially as set forth.

4. In a brake mechanism, the combination of a small cylinder and piston for imparting initial movement to the brake shoes, a large cylinder and piston for exerting the final pressure on the brake shoes, a valve controlling the passage of air from the small to the large cylinder, a stem located beneath said valve, a pivoted lever, and a rod connecting said stem to one end of said lever; the stem of the small piston being formed in two members, the inner one of which telescopes the outer one and is provided with a projection having an inclined face, and the outer one of which is provided with a notch to receive the outer end of said lever when the small piston has reached the limit of its outward movement, substantially as and for the purpose set forth.

5. In a brake mechanism, the combination of a small cylinder and piston for imparting the initial movement to the brake shoes, a large cylinder and piston for exerting the final pressure on the shoes, a valve mechanism for controlling the passage of air from the small to the large cylinder, and means for retarding the backward movement of the small piston while the air is exhausting from behind the large piston, substantially as set forth.

6. In a brake mechanism, the combination of a small cylinder and piston for imparting initial movement to the brake shoes, a large cylinder and piston for exerting the final pressure on the shoes, a valve for controlling the passage of air from the small to the large cylinder, and mechanism for opening said valve and which also acts as a lock to retard the backward movement of the small piston while the air is exhausting from behind the large piston, substantially as set forth.

7. In a brake mechanism, a small brake cylinder and piston for imparting initial movement to the brake shoes, a large brake cylinder and piston for exerting the final pressure on the shoes, and a valve mechanism controlling the passage of air from the small into the large brake cylinder, said cylinders being arranged back to back, substantially as set forth.

8. In a fluid pressure brake system, the combination with a small brake cylinder, its piston and piston rod, brake rigging and supply valve, of a larger brake cylinder, its piston and piston rod, and a valve mechanism for admitting fluid under pressure from the first to the second brake cylinder, said cylinders being arranged back to back.

9. In a fluid pressure brake system, the combination with a small brake cylinder, its piston and piston rod, brake rigging and supply valve, of a larger brake cylinder, its piston and piston rod, and a valve mechanism for admitting fluid under pressure from the first to the second brake cylinder, said cylinders being arranged back to back, and means for locking the piston rod of the main cylinder against backward movement.

10. In a fluid pressure brake system, the combination with a small brake cylinder, its piston and piston rod, brake rigging and supply valve, of a larger brake cylinder, its piston and piston rod, and a valve mechanism for admitting fluid under pressure to the larger brake cylinder after the movement of the piston in the small cylinder has begun, said cylinders being arranged back to back and their respective piston rods being connected to the adjacent brake levers.

Signed at Wilmerding, Pa., this 9th day of November, 1906.

THE WESTINGHOUSE AIR BRAKE CO.,
*Assignee.*

JOHN F. MILLER,
*Vice-President.*

Witnesses:
R. F. EMERY,
J. B. MACDONALD.